United States Patent
Endo

(10) Patent No.: US 12,083,480 B2
(45) Date of Patent: Sep. 10, 2024

(54) METHOD FOR CONTROLLING SLIME IN REVERSE OSMOSIS MEMBRANE APPARATUS

(71) Applicant: KURITA WATER INDUSTRIES LTD., Tokyo (JP)

(72) Inventor: Yoshihiko Endo, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 777 days.

(21) Appl. No.: 17/180,845

(22) Filed: Feb. 21, 2021

(65) Prior Publication Data

US 2021/0170341 A1 Jun. 10, 2021

Related U.S. Application Data

(63) Continuation-in-part of application No. PCT/JP2019/032827, filed on Aug. 22, 2019.

(30) Foreign Application Priority Data

Aug. 23, 2018 (JP) .................................. 2018-156578

(51) Int. Cl.
  *B01D 61/02* (2006.01)
  *B01D 61/04* (2006.01)
  (Continued)

(52) U.S. Cl.
  CPC .......... *B01D 65/08* (2013.01); *B01D 61/025* (2013.01); *B01D 61/04* (2013.01); *B01D 65/02* (2013.01);
  (Continued)

(58) Field of Classification Search
  CPC .. B01D 65/02; B01D 65/08; B01D 2321/162; B01D 2321/168; B01D 61/025; C02F 2303/20; C02F 1/441
  See application file for complete search history.

(56) References Cited

U.S. PATENT DOCUMENTS

2015/0351383 A1* 12/2015 Kolari .................... A01N 37/34
  514/528

FOREIGN PATENT DOCUMENTS

| CN | 102428037 | 4/2012 |
| CN | 104068028 | 10/2014 |

(Continued)

OTHER PUBLICATIONS

Nkajima et al—JP 2018114471 A machine translation—Jul. 26, 2018 (Year: 2018).*

(Continued)

*Primary Examiner* — Bradley R Spies
(74) *Attorney, Agent, or Firm* — JCIPRNET

(57) ABSTRACT

A method for controlling slime is used in a reverse osmosis membrane apparatus and has a water-supplying step of supplying water to be treated to the reverse osmosis membrane. The water-supplying step includes a first water-supplying step in which a slime controlling agent X which contains 2,2-dibromo-3-nitrilopropionamide (DBNPA) and a slime controlling agent Y which contains at least one type selected from a group consisting of components (A) to (D) are added to the water to be treated which has a pH of 10 or less, and the water to be treated which contains the slime controlling agent X and the slime controlling agent Y is supplied to the reverse osmosis membrane. The component (A) is mixture of 5-chloro-2-methyl-4-isothiazolin-3-one (Cl-MIT) and 2-methyl-4-isothiazolin-3-one (MIT), the component (B) is chloramine compound, the component (C) is stabilized bromide, and the component (D) is glutaraldehyde.

5 Claims, 3 Drawing Sheets

(51) Int. Cl.
  *B01D 65/02* (2006.01)
  *B01D 65/08* (2006.01)
  *C02F 1/44* (2023.01)

(52) U.S. Cl.
  CPC ........ *C02F 1/441* (2013.01); *B01D 2321/162* (2013.01); *B01D 2321/168* (2013.01); *B01D 2321/40* (2013.01)

(56) References Cited

FOREIGN PATENT DOCUMENTS

| JP | H01104310 | | 4/1989 |
|---|---|---|---|
| JP | 2002320968 | | 11/2002 |
| JP | 2009247992 | | 10/2009 |
| JP | 2012527350 | | 11/2012 |
| JP | 2015199020 | | 11/2015 |
| JP | 2017121605 | A * | 7/2017 |
| JP | 2018114471 | | 7/2018 |
| JP | 2018114473 | | 7/2018 |
| WO | 2013240762 | | 12/2013 |
| WO | 2016194443 | | 12/2016 |
| WO | 2018084061 | | 5/2018 |

OTHER PUBLICATIONS

Yokoi et al—JP 2013240762 A machine translation—Dec. 6, 2013 (Year: 2013).*
Koizumi—JP H01104310 A machine translation—Apr. 21, 1989 (Year: 1989).*
Gartner et al—CN 102428037 FIT Translation—Apr. 25, 2012 (Year: 2012).*
"Office Action of China Counterpart Application" with English translation thereof, issued on Dec. 17, 2021, p. 1-p. 12.
"International Search Report (Form PCT/ISA/210) of PCT/JP2019/032827," mailed on Oct. 15, 2019, with English translation thereof, pp. 1-4.

* cited by examiner

METHOD FOR CONTROLLING SLIME IN REVERSE OSMOSIS MEMBRANE APPARATUS

CROSS-REFERENCE TO RELATED APPLICATIONS

This application is a Continuation-In-Part of PCT International Application No. PCT/JP2019/032827, filed on Aug. 22, 2019, which claims priority under 35 U.S.C. § 119(a) to Japanese Patent Application No. 2018-156578, filed on Aug. 23, 2018. The above application is hereby expressly incorporated by reference, in its entirety, into the present application.

BACKGROUND REVERSE OSMOSIS MEMBRANE

Technical Field

The present invention relates to a method for controlling slime in a reverse osmosis membrane apparatus.

Related Art

A reverse osmosis membrane (RO membrane) included in a reverse osmosis membrane apparatus is used for drinking water production, pure water production, waste water reuse, and the like. In running of the reverse osmosis membrane apparatus, microorganisms such as bacteria and the like contained in water to be treated become slime (biofilm), adhere to a surface of the reverse osmosis membrane and proliferate, causing membrane clogging.

Conventionally, as a method for removing the slime which adheres to the surface of the reverse osmosis membrane and proliferates, a method is performed in which the running of the reverse osmosis membrane apparatus is stopped and the reverse osmosis membrane is washed with a chemical such as caustic soda or the like to remove the slime. However, this method hinders continuous running of the reverse osmosis membrane apparatus and causes an increase in running costs.

In recent years, a method is performed in which a slime controlling agent is injected into a water system supplied to the reverse osmosis membrane apparatus to remove the slime (biofilm) adhering to the surface of the reverse osmosis membrane, without stopping the running of the reverse osmosis membrane apparatus. Various kinds of compounds are studied as slime controlling agents for this method, and many slime controlling methods using the slime controlling agent have been proposed.

For example, Patent Literature 1 discloses a pure water production method including a slime control agent addition step, a film treatment step, an ultraviolet irradiation treatment step, and an ion exchange treatment step. In addition, Patent Literature 1 describes that the membrane treatment step is a reverse osmosis membrane treatment, and 2,2-dibromo-3-nitrilopropionamide is used as the slime control agent.

LITERATURE OF RELATED ART

Patent Literature

Patent literature 1: Japanese Patent Laid-Open No. 2009-247992

However, in the method of Patent Literature 1, it is necessary to use the slime control agent alone and undergo two steps of the ultraviolet irradiation treatment step and the ion exchange treatment step. In the method of Patent Literature 1, it takes effort and time because of a large number of steps, and thus further studies are required from the viewpoint of obtaining an effect of controlling the generation of the slime in a short time.

SUMMARY

[1] A method for controlling slime in a reverse osmosis membrane apparatus, which is used in a reverse osmosis membrane apparatus and has a water-supplying step of supplying water to be treated to a reverse osmosis membrane, wherein the water-supplying step includes a first water-supplying step in which a slime controlling agent X which contains 2,2-dibromo-3-nitrilopropionamide (DBNPA) and a slime controlling agent Y which contains at least one type selected from a group consisting of the following components (A) to (D) are added to water to be treated which has a pH of 10 or less, and the water to be treated which contains the slime controlling agent X and the slime controlling agent Y is supplied to the reverse osmosis membrane, Component (A): mixture of 5-chloro-2-methyl-4-isothiazolin-3-one (Cl-MIT) and 2-methyl-4-isothiazolin-3-one (MIT)
Component (B): chloramine compound
Component (C): stabilized bromide
Component (D): glutaraldehyde.

[2] The method for controlling slime in a reverse osmosis membrane apparatus according to [1] described above, wherein the component (B): chloramine compound is at least one type selected from a group consisting of a component (B-1) and a component (B-2), wherein the component (B-1) is a chloramine consisting of ammonium salt and chlorine, and the component (B-2) is at least one type selected from a group consisting of chlorosulfamic acid and chlorosulfamate.

[3] The method for controlling slime in a reverse osmosis membrane apparatus according to [1] or [2] described above, wherein the water-supplying step further includes a second water-supplying step in which water to be treated which does not contain the slime controlling agent X and the slime controlling agent Y is supplied to the reverse osmosis membrane.

[4] The method for controlling slime in a reverse osmosis membrane apparatus according to any one of [1] to [3] described above, wherein in the water-supplying step, the number of times of the water-supplying in the first water-supplying step is 1 to 14 times per week, and the water-supplying time per water-supplying is one hour or less.

[5] The method for controlling slime in a reverse osmosis membrane apparatus according to [4] described above, wherein the number of times of the water-supplying in the first water-supplying step is once per day.

[6] The method for controlling slime in a reverse osmosis membrane apparatus according to any one of [1] to [5] described above, wherein the first water-supplying step is run under at least one condition selected from a group consisting of the following operation conditions 1 to 4.

Operation condition 1: an operation condition in which the water is not separated into permeated water and concentrated water and is taken out only in the form of concentrated water Operation condition 2: an operation condition in which the water is separated into permeated water and concentrated water and respectively taken out, and the permeated water is discarded goes to the next process Operation condition 3: an operation condition in which the water is separated into permeated water and concentrated water and respectively taken out, and the permeated water is returned to raw water of the reverse osmosis membrane apparatus Operation condition 4: an operation condition in which the water is separated into permeated water and concentrated water and respectively taken out, and the permeated water and the concentrated water are returned to raw water of the reverse osmosis membrane apparatus

DESCRIPTION OF THE EMBODIMENTS

Figure 1:
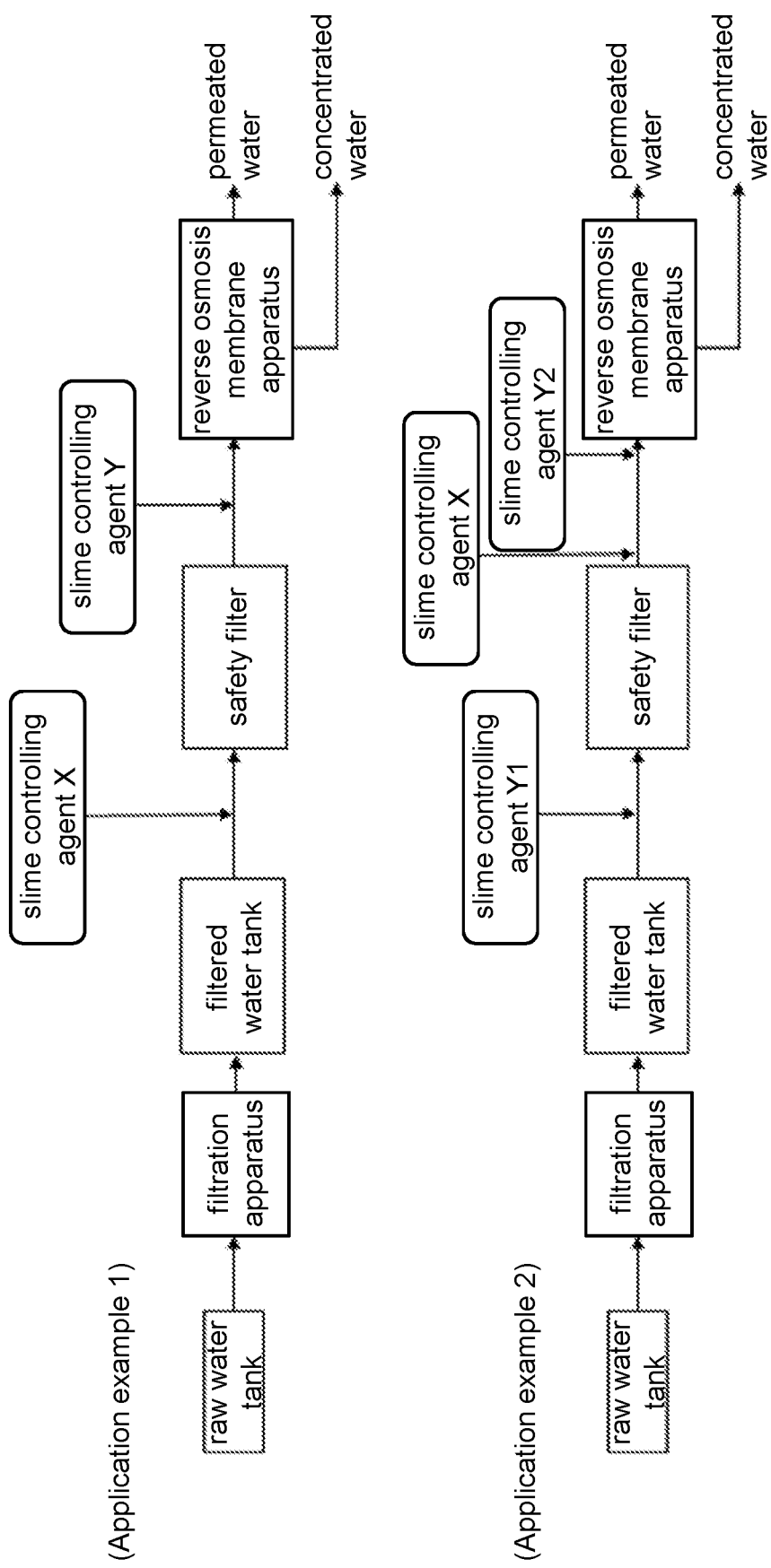
FIG. 1 is a diagram showing an application example of a method for controlling slime in a reverse osmosis membrane apparatus of the present invention.

According to an aspect of the present invention, there is provide a method for controlling slime in a reverse osmosis membrane apparatus in which an effect of controlling generation of slime (biofilm) and an effect of removing the slime (biofilm) even if the slime (biofilm) is generated and adheres to a surface of a reverse osmosis membrane are obtained in a short time.

According to another aspect of the present invention, the present inventor found that an effect of controlling generation of slime (biofilm) and an effect of removing the slime (biofilm) even if the slime (biofilm) is generated and adheres to a surface of a reverse osmosis membrane are obtained in a short time by combining 2,2-dibromo-3-nitrilopropionamide (DBNPA) which serves as a slime controlling agent X and a slime controlling agent Y specified in the present invention and supplying water to be treated containing the slime controlling agent X and the slime controlling agent Y to the reverse osmosis membrane, and the present invention has been completed.

According to the method for controlling slime in a reverse osmosis membrane apparatus of the present invention, the effect of controlling the generation of the slime (biofilm) and the effect of removing the slime (biofilm) even if the slime (biofilm) is generated and adheres to the surface of the reverse osmosis membrane are obtained in a short time.

A slime controlling method of the present invention is specially described below, which is applied to a reverse osmosis membrane apparatus and has a water-supplying step of supplying water to be treated to a reverse osmosis membrane.

[Method for Controlling Slime in Reverse Osmosis Membrane Apparatus]

The method for controlling slime in a reverse osmosis membrane apparatus in the present invention is applied to a reverse osmosis membrane apparatus and has a water-supplying step of supplying water to be treated to a reverse osmosis membrane. The water-supplying step includes a first water-supplying step in which a slime controlling agent X which contains 2,2-dibromo-3-nitrilopropionamide (DBNPA) and a slime controlling agent Y which contains at least one type selected from a group consisting of the following components (A) to (D) are added to water to be treated which has a pH of 10 or less, and the water to be treated which contains the slime controlling agent X and the slime controlling agent Y is supplied to the reverse osmosis membrane.

Component (A): mixture of 5-chloro-2-methyl-4-isothiazolin-3-one (Cl-MIT) and 2-methyl-4-isothiazolin-3-one (MIT)
    Component (B): chloramine compound
    Component (C): stabilized bromide
    Component (D): glutaraldehyde According to this method for controlling slime in a reverse osmosis membrane apparatus, an effect of controlling generation of slime (biofilm) and an effect of removing the slime (biofilm) even if the slime (biofilm) is generated and adheres to a surface of a reverse osmosis membrane are obtained in a short time.

Although detailed mechanisms of the effects obtained by the present invention are not clear, it is presumed that by using 2,2-dibromo-3-nitrilopropionamide (DBNPA) serving as the slime controlling agent X and the slime controlling agent Y specified in the present invention combination and supplying the water to be treated containing the slime controlling agent X and the slime controlling agent Y to the reverse osmosis membrane, even if the slime (biofilm) is generated, a function of removing adhesive components surrounding the microorganisms in the slime (biofilm) is excellent.

FIG. 1 shows an application example of the method for controlling slime in a reverse osmosis membrane apparatus of the present invention.

As shown in FIG. 1, the method for controlling slime in a reverse osmosis membrane apparatus in the present invention may include a pretreatment step before performing the water-supplying step of supplying the water to be treated to the reverse osmosis membrane of the reverse osmosis membrane apparatus.
    The pretreatment step may be, for example, a step in which raw water (water to be treated) in a raw water tank is filtered by a filtration apparatus, and the filtered treated water is supplied to a filtered water tank and a safety filter.

The method for controlling slime in a reverse osmosis membrane apparatus in the present invention may or may not include the above-mentioned pretreatment step, and even without the above-mentioned pretreatment step, through the water-supplying step specified in the present invention, the effect of controlling the generation of the slime (biofilm) and the effect of removing the slime (biofilm) even if the slime (biofilm) is generated and adheres to the surface of the reverse osmosis membrane are obtained in a short time.

(1) Water-Supplying Step

The water-supplying step of the present invention includes the first water-supplying step of supplying the water to be treated containing the slime controlling agent X and the slime controlling agent Y to the reverse osmosis membrane, and may further include a second water-supplying step of supplying water to be treated which does not contain the slime controlling agent X and the slime controlling agent Y to the reverse osmosis membrane.

(1-1) First Water-Supplying Step

In the first water-supplying step, the water to be treated containing the slime controlling agent X and the slime controlling agent Y is supplied to the reverse osmosis membrane of the reverse osmosis membrane apparatus.

Moreover, damage caused by the slime controlling agent X and the slime controlling agent Y to the reverse osmosis membrane is at a negligible level or within an acceptable range.

A method for containing the slime controlling agent X and the slime controlling agent Y in the water to be treated is not particularly limited, but in consideration that the slime controlling agent X and the slime controlling agent Y contained in the water to be treated reach the reverse osmosis membrane at the same time, timing of adding the slime controlling agent X and the slime controlling agent Y may be appropriately made different from each other.

For example, a method as in Application Example 1 shown in FIG. 1 is shown as an example. In the method, the slime controlling agent X is added to the water to be treated which is supplied at a predetermined speed and then the slime controlling agent Y is added. In addition, a method as in Application Example 2 shown in FIG. 1 is shown as an example. In the method, a slime controlling agent Y1 is added to the water to be treated which is supplied at a predetermined speed, then the slime controlling agent X is added, and then a slime controlling agent Y2 is added. Moreover, the slime controlling agents Y1 and Y2 here refer to different types of the slime controlling agent Y specified in the present invention.

An order in which the slime controlling agent X and the slime controlling agent Y are added is not particularly limited, and for example, an order in which the slime controlling agent X is added and then the slime controlling agent Y is added as shown in Application Example 1 of FIG. 1 is applicable, a reverse order is applicable, or the slime controlling agent X and the slime controlling agent Y may be added substantially at the same time. In addition, as shown in Application Example 2 of FIG. 1, two or more kinds of the slime controlling agent Y specified in the present invention may be used.

The timing of adding the slime controlling agent X and the slime controlling agent Y is not particularly limited as long as the slime controlling agent X and the slime controlling agent Y are contained in the water to be treated when the water to be treated comes into contact with the reverse osmosis membrane, and the timing may be immediately after the start of supplying of the water to be treated or may be immediately before the water to be treated comes into contact with the reverse osmosis membrane.

The pH of the water to be treated to which the slime controlling agent X and the slime controlling agent Y are added is 10 or less, preferably 9.0 to 3.0, and more preferably 8.0 to 5.0.

When the pH of the water to be treated exceeds the above range (exceeds pH 10), there is a possibility that hydrolysis of 2,2-dibromo-3-nitrilopropionamide (DBNPA) which is the slime controlling agent X proceeds and the effect of controlling the generation of the slime (biofilm) cannot be obtained.

The pH in the specification refers to a value obtained based on an operation of a glass electrode method in accordance with the method described in JIS 28802: 2011. Moreover, for pH calibration, each pH standard solution of phthalate, neutral phosphate, and carbonate can be used.

<Slime Controlling Agent X>

The slime controlling agent X in the present invention contains 2,2-dibromo-3-nitrilopropionamide (DBNPA), and may contain other components.

2,2-dibromo-3-nitrilopropionamide (DBNPA) is a lipophilic powder having low solubility in water, and thus is preferably made into a DBNPA mixture liquid using a solvent having lipophilic and hydrophilic properties.

The solvent having lipophilic and hydrophilic properties to be mixed with DBNPA is not particularly limited, and may be, for example, a glycol such as diethylene glycol, tetraethylene glycol, polyethylene glycol; an ether such as diethylene glycol monomethyl ether; or the like.

In addition, 2,2-dibromo-3-nitrilopropionamide (DBNPA) may be optionally added with pure water as necessary for a purpose of preventing flammability, together with the solvent having lipophilic and hydrophilic properties.

When DBNPA is made into a DBNPA mixture liquid using the solvent having lipophilic and hydrophilic properties and pure water, a content of DBNPA in the total amount (100 mass %) of the DBNPA mixture liquid is preferably 5 to 35 mass %, more preferably 10 to 30 mass %, and still more preferably 15 to 25 mass %.

A content of the solvent having lipophilic and hydrophilic properties in the total amount (100 mass %) of the DBNPA mixture liquid is preferably 30 to 80 mass %, more preferably 40 to 60 mass %, and still more preferably 45 to 55 mass %.

A content of the pure water in the total amount (100 mass %) of the DBNPA mixture liquid is preferably 15 to 45 mass %, more preferably 20 to 40 mass %, and still more preferably 25 to 35 mass %.

In addition, when DBNPA is made into a DBNPA mixture liquid using the solvent having lipophilic and hydrophilic properties without using pure water, the content of DBNPA in the total amount (100 mass %) of the DBNPA mixture liquid is preferably 20 to 50 mass %, more preferably 25 to 45 mass %, and still more preferably 30 to 40 mass %.

A content of the solvent having lipophilic and hydrophilic properties in the total amount (100 mass %) of the DBNPA mixture liquid is preferably 50 to 80 mass %, more preferably 55 to 75 mass %, and still more preferably 60 to 70 mass %.

When DBNPA exists in water to be treated having a high pH, there is a possibility that hydrolysis may proceed and a slime generation controlling effect and a slime removing effect of the slime controlling agent X may be reduced. Therefore, the pH of the water to be treated used in the first water-supplying step is required to be 10 or less.

The slime controlling agent X is added in a manner that an in-system retention concentration of DBNPA is preferably 3 to 80 mg/L as DBNPA, more preferably 5 to 60 mg/L as DBNPA, and still more preferably 10 to 40 mg/L as DBNPA.

Moreover, in the specification, the in-system retention concentration refers to a content of a target component contained in every 1 L of the water to be treated which is supplied at a predetermined water-supplying speed, and the same also applies hereinafter.

By the above-mentioned DBNPA having an in-system retention concentration within the above range, the effect of controlling the generation of the slime (biofilm) and the effect of removing the slime (biofilm) even if the slime (biofilm) is generated and adheres to the surface of the reverse osmosis membrane are easily obtained in a short time.

(Other Components)

The slime controlling agent X in the present invention contains 2,2-dibromo-3-nitrilopropionamide (DBNPA), and may also contain other substances such as an anti-scale component, pure water, and the like.

The anti-scale component may be, for example, polyacrylic acid or a sodium salt thereof; a copolymer of acrylic acid and 2-acrylamide-2-methylpropanesulfonic acid; a copolymer of vinyl acetate, acrylic acid alkyl ester, and maleic anhydride; a tertiary polymer sodium salt of 2-acrylamide-2-methylpropanesulfonic acid, acrylic acid, and N-tert-butylacrylamide; phosphinocarboxylic acid; phosphonic acid or phosphonate; or the like.

<Slime Controlling Agent Y>

The slime controlling agent Y in the present invention contains at least one type selected from the group consisting of the following components (A) to (D), and may contain other components.

Component (A): mixture of 5-chloro-2-methyl-4-isothiazolin-3-one (Cl-MIT) and 2-methyl-4-isothiazolin-3-one (MIT)
Component (B): chloramine compound
Component (C): stabilized bromide
Component (D): glutaraldehyde (Component (A): mixture of 5-chloro-2-methyl-4-isothiazolin-3-one (Cl-MIT) and 2-methyl-4-isothiazolin-3-one (MIT))

A content of 5-chloro-2-methyl-4-isothiazolin-3-one (Cl-MIT) contained in the component (A) in the total amount of the component (A) is preferably 0.3 to 14 mass %, more preferably 0.4 to 13 mass %, and still more preferably 0.5 to 12 mass %.

A content of 2-methyl-4-isothiazolin-3-one (MIT) contained in the component (A) in the total amount of the component (A) is preferably 0.09 to 4.2 mass %, more preferably 0.12 to 3.9 mass %, and still more preferably 0.15 to 3.6 mass %.

Moreover, a total amount of Cl-MIT and MIT in the total amount (100 mass %) of active components in the component (A) is preferably 80 to 100 mass %, more preferably 90 to 100 mass %, and still more preferably 95 to 100 mass %.

In addition, the component (A) may be diluted with pure water or a solvent.

A commercially available product can also be used as the component (A). The component (A) which is a commercially available product may be, for example, "KATHON WT", "KATHON WTA", or the like manufactured by Dow Chemical Japan Co., Ltd. KATHONWT contains about 10.4 mass % of Cl-MIT and about 3.5 mass % of MIT. In addition, KATHONWTA contains about 1.1 mass % of Cl-MIT and about 0.4 mass % of MIT.

The component (A) is added in a manner that an in-system retention concentration of Cl-MIT is preferably 0.5 to 15 mg/L as Cl-MIT, more preferably 1.0 to 5.0 mg/L as Cl-MIT, and still more preferably 1.0 to 2.0 mg/L as Cl-MIT. Here, the reason for defining the in-system retention concentration by the concentration of Cl-MIT is that the slime-controlling effect of the component (A) is mainly attributed to Cl-MIT. By the component (A) having an in-system retention concentration in the above range, the effect of controlling the generation of the slime (biofilm) and the effect of removing the slime (biofilm) by combined use of DBNPA which is the slime controlling agent X even if the slime (biofilm) is generated and adheres to the surface of the reverse osmosis membrane are easily obtained in a short time. The reason therefor is considered that the different types of slime-controlling effects exert a synergistic effect on the surface of the reverse osmosis membrane.

(Component (B): Chloramine Compound)

The chloramine compound refers to a compound having at least one bond (N—Cl bond) between a nitrogen atom and a chlorine atom.

The chloramine compound is at least one type selected from a group consisting of a component (B-1) and a component (B-2). Preferably, the component (B-1) is a chloramine consisting of an ammonium salt and chlorine, and the component (B-2) is at least one type selected from a group consisting of chlorosulfamic acid and chlorosulfamate.

The ammonium salt may be, for example, ammonium sulfate, ammonium nitrate, ammonium chloride, or the like. Among these compounds, ammonium sulfate is preferable.

The chlorosulfamic acid is obtained by substituting at least one hydrogen atom among $NH_2$ groups of sulfamic acid ($H_2NSO_2OH$) with a chlorine atom. The chlorosulfamic acid may be, for example, monochlorosulfamic acid, dichlorosulfamic acid, or the like.

The chlorosulfamate is obtained by substituting at least one hydrogen atom among OH groups of sulfamic acid ($H_2NSO_2OH$) with a metal ion (for example, lithium ion, sodium ion, potassium ion). The chlorosulfamate may be, for example, lithium chlorosulfamate, sodium chlorosulfamate, potassium chlorosulfamate, or the like. Among these compounds, sodium chlorosulfamate is preferable.

In addition, as other chloramine compounds, chloramine T or the like can be used.

A production example of sodium chlorosulfamate may be, for example, the method described in Example 1 of Japanese Patent No. 5720964.

The component (B-1), which is chloramine consisting of ammonium salt and chlorine, is added in a manner that an in-system retention concentration in the form of total chlorine concentration is preferably 0.5 to 7.0 mg/L as $Cl_2$, more preferably 0.5 to 5.0 mg/L as $Cl_2$, and still more preferably 1.0 to 3.0 mg/L as $Cl_2$.

By the component (B-1) having an in-system retention concentration in the above range, the effect of controlling the generation of the slime (biofilm) and the effect of removing the slime (biofilm) by combined use of DBNPA which is the slime controlling agent X even if the slime (biofilm) is generated and adheres to the surface of the reverse osmosis membrane are easily obtained in a short time.

The component (B-2), which is chlorosulfamic acid or chlorosulfamate, is added in a manner that an in-system retention concentration in the form of total chlorine concentration is preferably 0.5 to 8.0 mg/L as $Cl_2$, more preferably 0.5 to 6.0 mg/L as $Cl_2$, and still more preferably 1.0 to 4.0 mg/L as $Cl_2$.

By the component (B-2) having an in-system retention concentration in the above range, the effect of controlling the generation of the slime (biofilm) and the effect of removing the slime (biofilm) by combined use of DBNPA which is the slime controlling agent X even if the slime (biofilm) is generated and adheres to the surface of the reverse osmosis membrane are easily obtained in a short time. The reason therefor is considered that the different types of slime-controlling effects exert a synergistic effect on the surface of the reverse osmosis membrane.

(Component (C): Stabilized Bromide)

The stabilized bromide refers to a bromide that is not prone to change caused by decomposition or the like in water and can stably exist in water after being generated. The stabilized bromide may be, for example, a reaction product of "a reaction product of a bromine-based oxidizing agent or a bromine compound with a chlorine-based oxide" with "a sulfamic acid compound".

The bromine-based oxidizing agent may be, for example, bromine (liquid bromine), bromine chloride, bromic acid, bromate, hypobromous acid, or the like.

The bromine compound may be, for example, sodium bromide, potassium bromide, lithium bromide, ammonium bromide, hydrobromic acid, or the like.

The chlorine-based oxide may be, for example, chlorine gas, chlorine dioxide, hypochlorous acid or a salt thereof, chlorous acid or a salt thereof, chloric acid or a salt thereof, perchloric acid or a salt thereof, chlorinated isocyanuric acid or a salt thereof, or the like.

The hypochlorite may be, for example, an alkali metal hypochlorite such as sodium hypochlorite and potassium hypochlorite; an alkaline earth metal hypochlorite such as calcium hypochlorite and barium hypochlorite; or the like.

The chlorite may be, for example, an alkali metal chlorite such as sodium chlorite and potassium chlorite; an alkaline earth metal chlorite such as barium chlorite; other metal chlorites such as nickel chlorite; or the like.

The chlorate may be, for example, ammonium chlorate; an alkali metal chlorate such as sodium chlorate, potassium chlorate; an alkaline earth metal chlorate such as calcium chlorate and barium chlorate; or the like.

The perchlorate may be, for example, sodium perchlorate, potassium perchlorate, or the like.

The chlorinated isocyanurate may be, for example, sodium chlorinated isocyanurate.

The sulfamic acid compound is a compound represented by the following general formula (1).

$$R_2NSO_2OH \quad (1)$$

(In Formula (1), R is Independently a Hydrogen Atom or an Alkyl Group Having 1 to 8 Carbon Atoms.)

The sulfamic acid compound may be, for example, a sulfamic acid (amidosulfonic acid) in which both R groups are hydrogen atoms or salts thereof; a sulfamic acid in which one of the two R groups is a hydrogen atom and the other is an alkyl group having 1 to 8 carbon atoms, such as N-methylsulfamic acid, N-ethylsulfamic acid, N-propylsulfamic acid, N-isopropylsulfamic acid and N-butylsulfamic acid, or a salt of the sulfamic acid; a sulfamic acid in which both R groups are alkyl groups having 1 to 8 carbon atoms, such as N,N-dimethylsulfamic acid, N,N-diethylsulfamic acid, N,N-dipropylsulfamic acid, N,N-dibutylsulfamic acid, N-methyl-N-ethylsulfamic acid and N-methyl-N-propylsulfamic acid, or a salt of the sulfamic acid; or the like.

The sulfamate may be, for example, an alkali metal salt such as sodium salt and potassium salt; an alkaline earth metal salt such as calcium salt, strontium salt and barium salt; other metal salts such as manganese salt, copper salt, zinc salt, iron salt, cobalt salt and nickel salt; ammonium salt; guanidine salt; or the like.

A production example of the stabilized bromide may be, for example, a method in which an aqueous solution of sodium bromide is mixed with sodium hypochlorite to obtain Mixture solution 1, an aqueous solution of sulfamic acid is mixed with an aqueous solution of sodium hydroxide to obtain Mixture solution 2, and Mixture solution 1 and Mixture solution 2 are mixed.

The component (C) which is a stabilized bromide is added in a manner that an in-system retention concentration in the form of total chlorine concentration is preferably 0.1 to 7.0 mg/L as $Cl_2$, more preferably 0.2 to 5.0 mg/L as $Cl_2$, and still more preferably 0.3 to 3.0 mg/L as $Cl_2$.

By the component (C) having an in-system retention concentration in the above range, the effect of controlling the generation of the slime (biofilm) and the effect of removing the slime (biofilm) by combined use of DBNPA which is the slime controlling agent X even if the slime (biofilm) is generated and adheres to the surface of the reverse osmosis membrane are easily obtained in a short time. The reason therefor is considered that the different types of slime-controlling effects exert a synergistic effect on the surface of the reverse osmosis membrane.

(Component (D): Glutaraldehyde)

The glutaraldehyde is preferably made into a glutaraldehyde solution by using water in order to maintain stability of active components.

When the glutaraldehyde is made into a glutaraldehyde solution by using water, a content of the glutaraldehyde in the total amount (100 mass %) of the glutaraldehyde solution is preferably 5 to 70 mass %, more preferably 10 to 60 mass %, and still more preferably 15 to 55 mass %.

A commercially available product can also be used as the glutaraldehyde solution.

The glutaraldehyde solution which is a commercially available product may be, for example, "glutaraldehyde solution (glutaraldehyde content: 50 mass %, water content: 50 mass %)" manufactured by Kishida Chemical Co., Ltd., or the like.

The component (D) is added in a manner that an in-system retention concentration of the glutaraldehyde is preferably 10 to 200 mg/L as glutaraldehyde, more preferably 20 to 150 mg/L as glutaraldehyde, and still more preferably 30 to 100 mg/L as glutaraldehyde.

By the component (D) having an in-system retention concentration in the above range, the effect of controlling the generation of the slime (biofilm) and the effect of removing the slime (biofilm) by combined use of DBNPA which is the slime controlling agent X even if the slime (biofilm) is generated and adheres to the surface of the reverse osmosis membrane are easily obtained in a short time. The reason therefor is considered that the different types of slime-controlling effects exert a synergistic effect on the surface of the reverse osmosis membrane.

(Combined Use of Two or More Types of Slime Controlling Agents Y Specified in the Present Invention)

The slime controlling agent Y specified in the present invention contains at least one type selected from the group consisting of the aforementioned components (A) to (D), and may contain two or more types selected from the group consisting of the aforementioned components (A) to (D).

When the slime controlling agent Y specified in the present invention contains two or more types selected from the group consisting of the aforementioned components (A) to (D), the two or more types of slime controlling agents Y may be mixed with a solvent and used as one chemical, or the two or more types of slime controlling agents Y may be respectively mixed with different solvents and used as two or more chemicals.

(Other Components)

The slime controlling agent Y in the present invention contains at least one type selected from the group consisting of the above-mentioned components (A) to (D), and may contain other components.

Other components may be, for example, an anti-scale component such as polyacrylic acid or a sodium salt thereof; a copolymer of acrylic acid and 2-acrylamide-2-methylpropanesulfonic acid; a copolymer of vinyl acetate, acrylic acid alkyl ester, and maleic anhydride; a tertiary polymer sodium salt of 2-acrylamide-2-methylpropanesulfonic acid, acrylic acid, and N-tert-butylacrylamide; phosphinocarboxylic acid; phosphonic acid or phosphonate; or the like.

(1-2) Second Water-Supplying Step

In the case of the reverse osmosis membrane apparatus having a main purpose of producing drinking water, pure water, or the like, the water-supplying step of the present invention preferably includes, in addition to the first water-supplying step, the second water-supplying step of supplying the water to be treated which does not contain the slime controlling agent X and the slime controlling agent Y to the reverse osmosis membrane without adding the slime controlling agent X and the slime controlling agent Y.

The first water-supplying step is a step having a main purpose of controlling the generation of the slime, whereas the second water-supplying step is a step having a main purpose of producing drinking water, pure water, or the like and stops addition of chemicals in order to prevent the chemicals from remaining in the permeated water in a trace amount.

In the water-supplying step, when the number of times of the water-supplying in the first water-supplying step of supplying the water to be treated to the reverse osmosis membrane is 1 to 14 times per week and the main purpose is to produce drinking water, pure water, or the like, a water-supplying time per water-supplying is preferably 1 hour or less, more preferably 0.7 hour or less, and still more preferably 0.5 hour or less. Moreover, the number of times of the water-supplying in the first water-supplying step is preferably once per day.

Even if the water-supplying time of the first water-supplying step is within the above range (1 hour or less), that is, a short time, the effect of controlling the generation of the slime (biofilm) and the effect of removing the slime (biofilm) even if the slime (biofilm) is generated and adheres to the surface of the reverse osmosis membrane are obtained. In addition, when the water-supplying step includes the second water-supplying step, because the water-supplying time of the first water-supplying step is within the above range (1 hour or less), more water-supplying time of the second water-supplying step can be secured correspondingly. Accordingly, more permeated water can be obtained in a separation step which is the next step of the water-supplying step, and thus productivity of drinking water production, pure water production, or the like can be remarkably improved.

When the water-supplying step includes the second water-supplying step, in the second water-supplying step, the water to be treated which does not contain the slime controlling agent X and the slime controlling agent Y is supplied to the reverse osmosis membrane, and thus the permeated water obtained by separating the water to be treated through the second water-supplying step can be suitably used for drinking water, pure water, or the like.

On the other hand, in the first water-supplying step included in the water-supplying step, the water to be treated containing the slime controlling agent X and the slime controlling agent Y is supplied to the reverse osmosis membrane, and thus it is not desirable that the permeated water obtained by separating the water to be treated through the first water-supplying step is used for drinking water, pure water, or the like. Therefore, the first water-supplying step is preferably run under at least one condition selected from a group consisting of the following operating conditions 1 to 4.

Operation condition 1: an operation condition in which the water is not separated into permeated water and concentrated water and is taken out only in the form of concentrated water Operation condition 2: an operation condition in which the water is separated into permeated water and concentrated water and respectively taken out, and the permeated water is discarded Operation condition 3: an operation condition in which the water is separated into permeated water and concentrated water and respectively taken out, and the permeated water is returned to the raw water of the reverse osmosis membrane apparatus Operation condition 4: an operation condition in which the water is separated into permeated water and concentrated water and respectively taken out, and the permeated water and the concentrated water are returned to the raw water of the reverse osmosis membrane apparatus.

The method for controlling slime in a reverse osmosis membrane apparatus according to the present invention may also be achieved by a control portion including a CPU or the like in an apparatus (for example, a personal computer) for managing water quality of the water to be treated which is the treatment target.

In addition, the method for controlling slime in a reverse osmosis membrane apparatus according to the present invention can also be stored as a program in hardware resource including a recording medium (a nonvolatile memory (a USB memory or the like), HDD, CD, etc.) or the like and achieved by the control portion. A slime controlling system for a reverse osmosis membrane apparatus can also be provided which controls, by the control portion, amounts, timings, and the like of adding the slime controlling agent X and the slime controlling agent Y to the water to be treated.

EXAMPLES

The present invention is described more specifically with reference to the following examples, but the present invention is not limited to these examples.

[Preparation for Slime Control Test]

(1) Water to be Treated

For the raw water, tap water from Nogi-machi, Shimotsuga-gun, Tochigi Prefecture (hereinafter referred to as "Nogi-machi water") collected on Mar. 29, 2016 was used.

With respect to water quality of the Nomoto-cho water at this time, a concentration of total organic carbon (TOC) was 0.93 mg/L, a nitrate ion concentration was 11 mg/L, and an orthophosphoric acid concentration was 11.9 mass ppb in terms of phosphorus. Then, chlorine contained in the Nomoto-cho water was removed by an activated carbon filter filled with granular activated carbon (manufactured by Kurita Water Industries Ltd., "Kuricoal A-WG") to make water to be treated. The pH of the water to be treated was 7.1 to 7.5.

In addition, when the water to be treated was a measurement target and the total chlorine concentration was obtained by [measurement-evaluation method] (1): measurement method for total chlorine concentration described later, the total chlorine concentration was less than 0.05 mg/L as $Cl_2$ (less than lower limit of detection).

(2) Nutrients

Nutrients shown below were used for the purpose of proliferating slime (biofilm) in the system in a short period of time.

A nutrient was prepared using pure water in a manner that acetic acid was 1063 mg/L, potassium monohydrogen phosphate was 75 mg/L, and sodium dihydrogen phosphate dihydrate was 19 mg/L.

(3) Slime Controlling Agent X

Reagents shown below were used as the slime controlling agent X.

DBNPA Reagent 2,2-dibromo-3-nitrilopropionamide (DBNPA) was mixed with pure water and teraethylene glycol which is a solvent having lipophilic and hydrophilic properties to prepare a DBNPA reagent containing 20 mass % of DBNPA, 50 mass % of tetraethylene glycol, and 30 mass % of pure water.

(4) Slime Controlling Agent Y

Each reagent shown below was used as the slime controlling agent Y.

(4-1) Component (A): Mixture Reagent of Cl-MIT and MIT

"KATHON WT" manufactured by Dow Chemical Japan Co., Ltd. was used as a mixture reagent of 5-chloro-2-methyl-4-isothiazolin-3-one (Cl-MIT) and 2-methyl-4-isothiazolin-3-one (MIT). Moreover, this reagent contains about 10.4 mass % of Cl-MIT and about 3.5 mass % of MIT.

(4-2) Component (B-1): Chloramine Reagent Consisting of Ammonium Salt and Chlorine After 1.24 g of ammonium sulfate (manufactured by Kishida Chemical Co., Ltd.) was added to and mixed with 800 mL of pure water, 2.5 g of an aqueous solution of sodium hypochlorite (manufactured by Asahi Glass Co., Ltd.) having an active chlorine concentration of 12 mass % was further added and mixed to make a mixture liquid. Finally, 1 L of the chloramine reagent consisting of ammonium salt and chlorine was prepared by adding pure water to the mixture liquid. Moreover, a total chlorine concentration of the reagent was 300 mg/L as $Cl_2$.

(4-3) Component (B-2): Monosodium Chlorosulfamate Reagent

An aqueous solution of sodium hydroxide was prepared using pure water in a manner that sodium hydroxide (manufactured by Kishida Chemical Co., Ltd.) was 48 mass %. After 19.5 g of the pre-prepared aqueous solution of sodium hydroxide and 7.5 g of pure water are mixed, 15.0 g of amidosulfonic acid (manufactured by Kishida Chemical Co., Ltd.) was added and mixed. Thereafter, 58.0 g of sodium hypochlorite (manufactured by Asahi Glass Co., Ltd.) having an active chlorine concentration of 12 mass % was added and mixed to prepare a monochlorosulfamic acid reagent. Moreover, a total chlorine concentration of the reagent was 7 mass % as $Cl_2$.

(4-4) Component (C): Stabilized Bromide Reagent

An aqueous solution of sodium bromide was prepared using pure water in a manner that sodium bromide (manufactured by Kishida Chemical Co., Ltd.) was 45 mass %. Next, 63.6 g of 12 mass % sodium hypochlorite (manufactured by Asahi Glass Co., Ltd.) and 30.8 g of the pre-prepared aqueous solution of sodium bromide are mixed to make Mixture solution 1.

An aqueous solution of sodium hydroxide was prepared using pure water in a manner that sodium hydroxide (manufactured by Kishida Chemical Co., Ltd.) was 48 mass %. On the other hand, 14.4 g of amidosulfonic acid (manufactured by Kishida Chemical Co., Ltd.) and 20.2 g of pure water are mixed, and 20.7 g of the pre-prepared aqueous solution of sodium hydroxide was further mixed to make Mixture solution 2.

Then, Mixture solution 1 and Mixture solution 2 are mixed to prepare a stabilized bromide reagent. Moreover, a total chlorine concentration of the reagent was 5 mass % as $Cl_2$.

(4-5) Component (D): Glutaraldehyde Reagent

The "glutaraldehyde solution (glutaraldehyde content: 50 mass %, water content: 50 mass %)" manufactured by Kishida Chemical Co., Ltd. was used as a glutaraldehyde reagent.

(5) Simulation Apparatus Used for Slime Control Test

Figure 2:
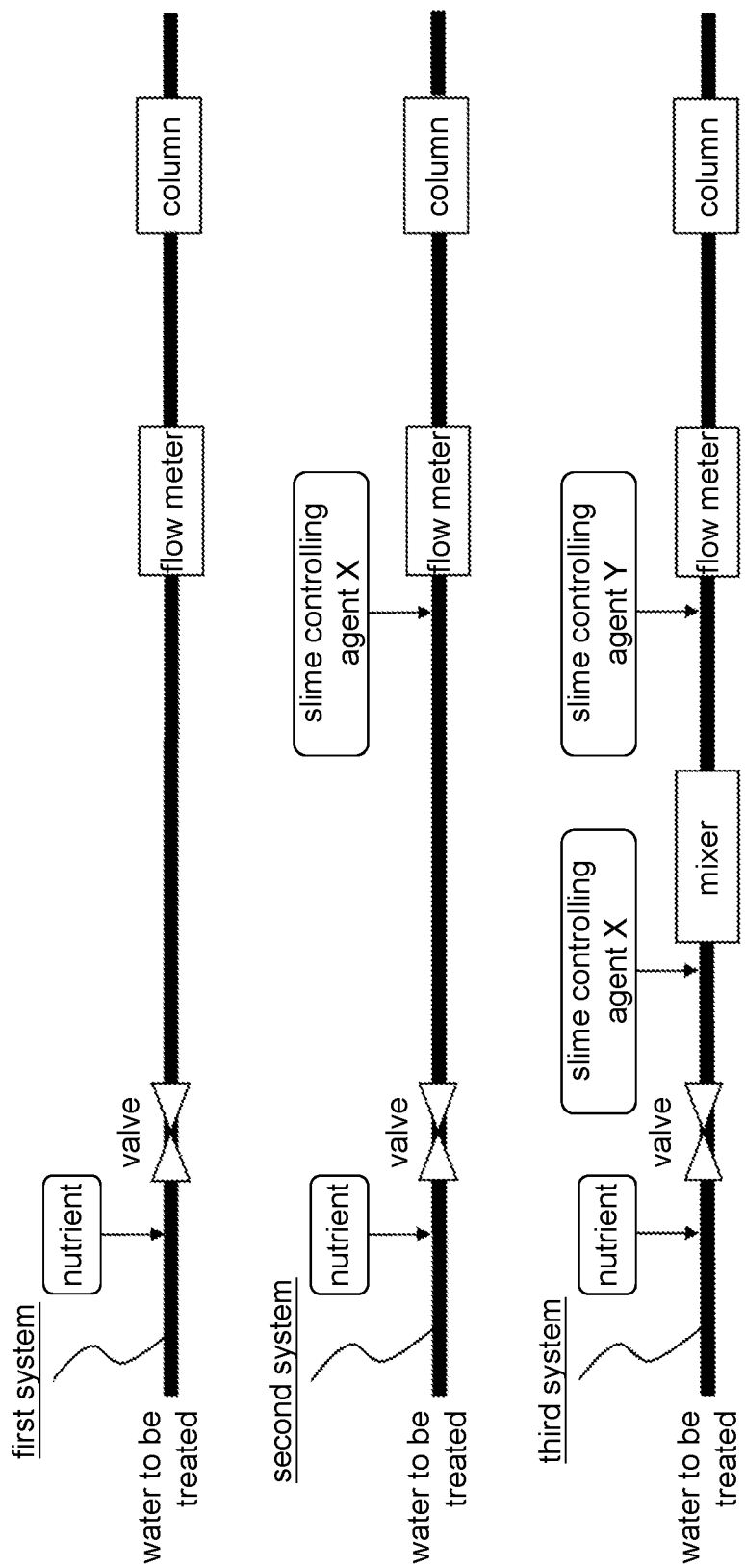
FIG. 2 is a system diagram of an apparatus used in an evaluation test of a slime-controlling effect and simulating a reverse osmosis membrane apparatus.

FIG. 2 is a system diagram of an apparatus used in an evaluation test of the slime control effect and simulating a reverse osmosis membrane apparatus.

A commercially available ¼ inch double nipple (inner diameter: 13.8 mm, length: 26 mm, inner surface area: about 11 $cm^2$) was housed as a test piece in a column of the simulation apparatus shown in FIG. 2. An amount of microorganisms adhered to an inner surface of the test piece was obtained by [measurement-evaluation method] (2): measurement-evaluation method of microorganism adhesion amount described later, and slime control effects of Examples 1 to 5 and Comparative Examples 1 and 2 were evaluated.

As shown in FIG. 2, the simulation apparatus was run in respective manners that the slime controlling agents X and Y were not used in a first system (Comparative Example 1), only the slime controlling agent X was used in a second system (Comparative Example 2), and the slime controlling agents X and Y were used in a third system (Examples 1 to 5).

Example 1

The third system of the simulation apparatus shown in FIG. 2 was used, and a valve was opened to continuously supply the water to be treated (raw water) prepared above for 7 days under a condition of 1.7 L/min. Moreover, the nutrient prepared above was continuously added to the water to be treated for 7 days under a condition of 1 mL/min, and at a frequency of once a day for 30 minutes, the DBNPA reagent prepared above as the slime controlling agent X was added in a manner that the in-system retention concentration of DBNPA was 10 mg/L as DBNPA, and the component (B-2): monosodium chlorosulfamate reagent prepared above as the slime controlling agent Y was added in a manner that the in-system retention concentration in the form of total chlorine concentration was 2.4 mg/L as $Cl_2$.

Example 2

The water-supplying step was carried out and the slime control test of Example 2 was performed in the same manner as in Example 1 except that the type of the slime controlling agent Y was changed to the component (A): mixture reagent of Cl-MIT and MIT and the in-system retention concentration of Cl-MIT was changed to 1.5 mg/L as Cl-MIT in Example 1.

Example 3

The water-supplying step was carried out and the slime control test of Example 3 was performed in the same manner as in Example 1 except that the type of the slime controlling agent Y was changed to the component (B-1): chloramine reagent consisting of ammonium salt and chlorine and the in-system retention concentration of the chloramine reagent was changed to 2.0 mg/L as $Cl_2$ in the form of total chlorine concentration in Example 1.

Example 4

The water-supplying step was carried out and the slime control test of Example 4 was performed in the same manner as in Example 1 except that the type of the slime controlling agent Y was changed to the component (C): stabilized bromide reagent and the in-system retention concentration of the stabilized bromide reagent was changed to 1.0 mg/L as $Cl_2$ in the form of total chlorine concentration in Example 1.

Example 5

The water-supplying step was carried out and the slime control test of Example 5 was performed in the same manner as in Example 1 except that the type of the slime controlling agent Y was changed to the component (D): glutaraldehyde reagent and the in-system retention concentration of the glutaraldehyde was changed to 50.0 mg/L as glutaraldehyde in Example 1.

Comparative Example 1

The water-supplying step was carried out and the slime control test of Comparative Example 1 was performed in the same manner as in Example 1 except that the system was changed to the first system of the simulation apparatus shown in FIG. 2 and the slime controlling agent X and the slime controlling agent Y are not added in Example 1.

Comparative Example 2

The water-supplying step was carried out and the slime control test of Comparative Example 2 was performed in the same manner as in Example 1 except that the system was changed to the second system of the simulation apparatus shown in FIG. 2, the slime controlling agent X was added at a frequency of once a day for 1 hour, and the slime controlling agent Y was not added in Example 1.

[Measurement-Evaluation Method]

(1) Measurement Method for Total Chlorine Concentration

Total chlorine concentrations (mg/L as C12) of the chloramine compound and the stabilized bromide can be measured by a colorimetric analysis (DPD method) using potassium iodide and a DPD reagent. In the example, a pocket residual chlorine meter (manufactured by HACH, "HACH2470") was used, and light absorption of a sample at a specific wavelength after 300 seconds with the DPD (Total) reagent which is a total chlorine measurement reagent was measured, thereby obtaining the total chlorine concentration. In addition to all the chlorine, all the bromine can also be measured by the DPD method, and in the specification, the total bromine concentration was converted into the total chlorine concentration and obtained.

(2) Measurement-Evaluation Method of Microorganism Adhesion Amount

After the water-supplying steps of Examples 1 to 5 and Comparative Examples 1 to 2 were carried out, the test pieces housed in each column were respectively taken out and an emission amount (RLU) was measured according to Procedures 1 to 8 shown below to evaluate the effect of controlling the generation of the slime (biofilm). Results were shown in Table 1.

Moreover, the emission amount (RLU) represents an amount of adenosine triphosphate (ATP), and the higher the number of surviving bacteria, the higher the value. Therefore, the emission amount (RLU) can be used as an index showing a generation amount of the slime (biofilm).

Figure 3:
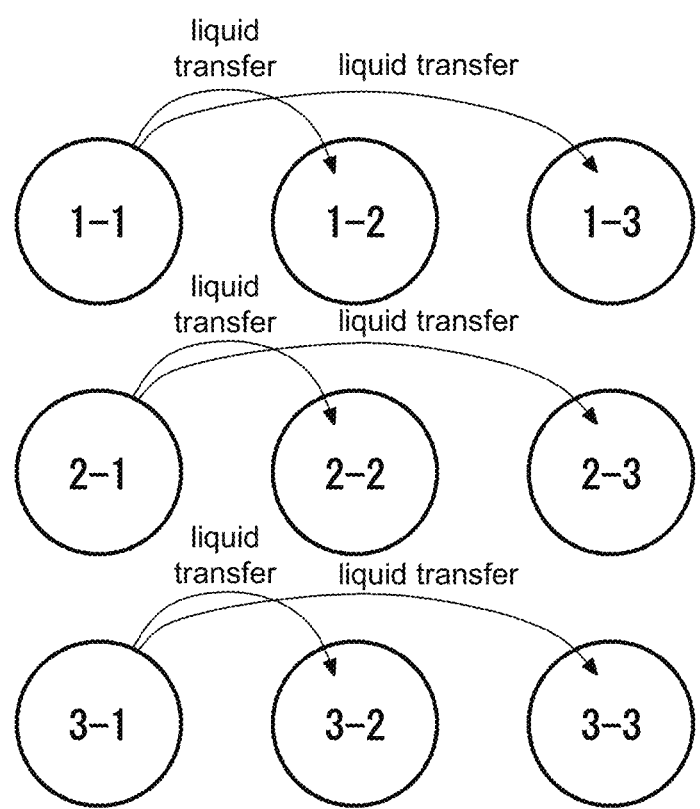
FIG. 3 is a schematic diagram of a multi-well plate used in measuring a microorganism adhesion amount.

Procedure 1: 1 mL of ultrapure water was injected to each of Wells 1-1, 2-1, 3-1 of a multi-well plate (manufactured by Corning Co., Ltd., "Falcon (registered trademark) 24-well Multiwell Flat Bottom TC-treated Cell Culture Plate") shown in FIG. 3.

Procedure 2: The slime adhering to the inner surface of each test piece was wiped off with a sterilized cotton swab.

Procedure 3: The cotton swab was put in Well 1-1 and shaken.

Procedure 4: Next, the cotton swab was put in Well 2-1 and shaken, and then the cotton swab was put in Well 3-1 and shaken.

Procedure 5: 100 μL of the liquid in Well 1-1 was transferred to Measurement Well 1-2, and 100 μL of the liquid in Well 1-1 was transferred to Measurement Well 1-3. Similarly, 100 μL of the liquid in Well 2-1 was transferred to Measurement Well 2-2, and 100 μL of the liquid in Well 2-1 was transferred to Measurement Well 2-3. In addition, 100 μL of the liquid in Well 3-1 was transferred to Measurement Well 3-2, and 100 μL of the liquid in Well 3-1 was transferred to Measurement Well 3-3.

Procedure 6: 10 μL of an ATP emission reagent (manufactured by Kikkoman Biochemifa Co., Ltd., "Lucifer 250 Plus") was added to each of Measurement Wells 1-2, 1-3, 2-2, 2-3, 3-2, and 3-3.

Procedure 7: The sample in each well was transferred to a test tube and contacted with a vortex mixer, and the sample was stirred.

Procedure 8: Within 20 seconds after stirring, a luminometer (manufactured by Kikkoman Biochemifa Co., Ltd., "Lumitester C-110") was used to respectively measure emission amounts (Relative Light Unit; RLU) with 6 content liquid of Measurement Wells 1-2, 1-3, 2-2, 2-3, 3-2, and 3-3 as targets, an average emission amount thereof was obtained, and an average emission amount per area of the inner surface of the test piece (RLU/$cm^2$) was calculated.

The average emission amount (RLU/$cm^2$) per inner surface area of the test piece of Comparative Example 1 is set to 100, and the ratio of the calculated values (RLU/$cm^2$) of the average emission amounts of Examples 1 to 5 and Comparative Example 2 is used as indexes. Specifically, the index average emission amounts (RLU/$cm^2$) of Examples 1 to 5 and Comparative Example 2 are calculated by the following formula (I) respectively. In addition, the average emission amounts and the indexes of average emission amounts of Examples 1 to 5 and Comparative Examples 1 and 2 were shown in Table 2. It can be evaluated that the smaller the index of the average emission amount (RLU/$cm^2$), the higher the effect of controlling the generation of the slime (biofilm).

Index of average emission amount=[(Average emission amount)/(Average emission amount) of Comparative Example 1)]×100  formula (I)

TABLE 1

| | Slime controlling agent X | | | Slime controlling agent Y | | | Time of addition per once at a frequency of once/24 hours (hr) | Index of average emission amount (RLU/cm$^2$) |
|---|---|---|---|---|---|---|---|---|
| | Controlling agent X | In-system retention concentration | Unit | Controlling agent Y | In-system retention concentration | Unit | | |
| Example 1 | DBNPA-based reagent | 10 | mg/L as DBNPA | Component (B-2): monosodium chlorosulfamate reagent | 2.4 | mg/L as Cl$_2$ | 0.5 | 36 |
| Example 2 | DBNPA-based reagent | 10 | mg/L as DBNPA | Component (A): mixture reagent of Cl-MIT and MIT | 1.5 | mg/L as Cl-MIT | 0.5 | 17 |
| Example 3 | DBNPA-based reagent | 10 | mg/L as DBNPA | Component (B-1): chloramine reagent consisting of ammonium salt and chlorine | 2.0 | mg/L as Cl$_2$ | 0.5 | 56 |
| Example 4 | DBNPA-based reagent | 10 | mg/L as DBNPA | Component (C): stabilized bromide reagent | 1.0 | mg/L as Cl$_2$ | 0.5 | 56 |
| Example 5 | DBNPA-based reagent | 10 | mg/L as DBNPA | Component (D): glutaraldehyde | 50.0 | mg/L as glutaraldehyde | 0.5 | 7 |
| Comparative Example 1 | — | — | mg/L as DBNPA | — | — | — | — | 100 |
| Comparative Example 2 | DBNPA-based reagent | 10 | mg/L as DBNPA | — | — | — | 1 | 56 |

TABLE 2

| | Average emission amount (RLU/cm$^2$) | Index of average emission amount (RLU/cm$^2$) |
|---|---|---|
| Example 1 | 3446 | 36 |
| Example 2 | 1627 | 17 |
| Example 3 | 5360 | 56 |
| Example 4 | 5360 | 56 |
| Example 5 | 670 | 7 |
| Comparative Example 1 | 9571 | 100 |
| Comparative Example 2 | 5360 | 56 |

Summary of Results

From the evaluation results shown in Table 1, the following can be seen.

In Comparative Example 1, due to the fact that neither the slime controlling agent X nor the slime controlling agent Y was used, neither the effect of controlling the generation of the slime nor the effect of removing the slime was obtained.

On the other hand, in Comparative Example 2, due to the use of the slime controlling agent X, the effect of controlling the generation of the slime and the effect of removing the slime were obtained, but the addition time of the first water-supplying step once/24 hours was 1 hour.

In contrast, in Examples 1 to 5, due to the combination use of the slime controlling agent X and the slime controlling agent Y, the effect of controlling the generation of the slime and the effect of removing the slime were obtained.

Although the addition time of the first water-supplying step once/24 hours was 30 minutes, which was half the time of Comparative Example 2, it was confirmed that the obtained effects have a level equal to or higher than that of Comparative Example 2.

What is claimed is:

1. A method for controlling slime in a reverse osmosis membrane apparatus, which is used in a reverse osmosis membrane apparatus and has a water-supplying step of supplying water to be treated to a reverse osmosis membrane, wherein
the water-supplying step comprises a first water-supplying step in which a slime controlling agent X which contains 2,2-dibromo-3-nitrilopropionamide (DBNPA) and a slime controlling agent Y which contains at least one type selected from a group consisting of the following components (A) to (D) are added to water to be treated which has a pH of 10 or less, and the water to be treated which contains the slime controlling agent X and the slime controlling agent Y is supplied to the reverse osmosis membrane,
Component (A): mixture of 5-chloro-2-methyl-4-isothiazolin-3-one (Cl-MIT) and 2-methyl-4-isothiazolin-3-one (MIT)
Component (B): chloramine compound
Component (C): stabilized bromide
Component (D): glutaraldehyde, and
the first water-supplying step is run under at least one condition selected from a group consisting of the following operation conditions 1 to 3,
Operation condition 1: an operation condition in which the water is separated into permeated water and concentrated water and respectively taken out, and the permeated water is discarded Operation condition 2: an operation condition in which the water is separated into permeated water and concentrated water and respectively taken out, and the permeated water is returned to raw water of the reverse osmosis membrane apparatus Operation condition 3: an operation condition in which the water is separated into permeated water and concentrated water and respectively taken out, and the permeated water and the concentrated water are returned to raw water of the reverse osmosis membrane apparatus.

2. The method for controlling slime in a reverse osmosis membrane apparatus according to claim 1, wherein the component (B): chloramine compound is at least one type selected from a group consisting of a component (B-1) and a component (B-2), wherein the component (B-1) is a chloramine consisting of ammonium salt and chlorine, and the component (B-2) is at least one type selected from a group consisting of chlorosulfamic acid and chlorosulfamate.

3. The method for controlling slime in a reverse osmosis membrane apparatus according to claim 1, wherein the water-supplying step further comprises a second water-supplying step in which water to be treated which does not contain the slime controlling agent X and the slime controlling agent Y is supplied to the reverse osmosis membrane.

4. The method for controlling slime in a reverse osmosis membrane apparatus according to claim 1, wherein in the water-supplying step, the number of times of the water-supplying in the first water-supplying step is 1 to 14 times per week, and the water-supplying time per water-supplying is one hour or less.

5. The method for controlling slime in a reverse osmosis membrane apparatus according to claim 4, wherein the number of times of the water-supplying in the first water-supplying step is once per day.

* * * * *